(12) United States Patent
Carignan et al.

(10) Patent No.: US 8,302,343 B2
(45) Date of Patent: Nov. 6, 2012

(54) FISH STRIKE INDICATOR (76) Inventors: Lawrence William Carignan, Baraboo, WI (US); Darin Allan Carignan, Baraboo, WI (US)

( * ) Notice: Subject to any disclaimer, the term of this patent is extended or adjusted under 35 U.S.C. 154(b) by 349 days.

(21) Appl. No.: 12/631,045

(22) Filed: Dec. 4, 2009

(65) Prior Publication Data

US 2010/0139149 A1 Jun. 10, 2010

Related U.S. Application Data (60) Provisional application No. 61/120,434, filed on Dec. 6, 2008.

(51) Int. Cl.
*A01K 97/12* (2006.01)
(52) U.S. Cl. .................................. 43/17; 43/16; 43/25
(58) Field of Classification Search ............... 43/15, 16, 43/17, 25; *A01K 97/12*
See application file for complete search history.

(56) References Cited

U.S. PATENT DOCUMENTS

| | | | |
|---|---|---|---|
| 4,146,988 A | 4/1979 | Bednarczyk | |
| 4,265,046 A * | 5/1981 | Keith | 43/21.2 |
| 4,837,965 A | 6/1989 | True | |
| 5,063,373 A | 11/1991 | Lindsley | |
| 5,074,072 A * | 12/1991 | Serocki et al. | 43/17 |
| 5,129,174 A | 7/1992 | Wilson | |
| 5,586,402 A | 12/1996 | Brendt et al. | |
| 5,638,629 A | 6/1997 | Robichaud et al. | |
| 5,832,652 A | 11/1998 | Bartys | |
| 5,896,694 A * | 4/1999 | Midha | 43/17 |
| 5,970,645 A | 10/1999 | Thill | |
| 5,987,801 A | 11/1999 | Anderson | |
| 6,119,389 A * | 9/2000 | Walker | 43/43.13 |
| 6,354,036 B1 | 3/2002 | Carlson et al. | |
| 6,421,948 B1 | 7/2002 | Craig | |
| 6,935,068 B2 | 8/2005 | Shackelford | |
| 7,043,867 B1 | 5/2006 | Fox | |
| 7,281,348 B2 * | 10/2007 | Allen et al. | 43/17 |
| 7,377,069 B2 * | 5/2008 | Morris | 43/15 |
| 7,395,628 B2 | 7/2008 | Rayfield | |
| 7,454,861 B1 | 11/2008 | Keibler | |
| 2005/0034348 A1 * | 2/2005 | Grahl et al. | 43/17 |

* cited by examiner

*Primary Examiner* — Darren W Ark
*Assistant Examiner* — Lisa Tsang
(74) *Attorney, Agent, or Firm* — Brannen Law Office, LLC (57) ABSTRACT

A fish strike signal that can selectively be placed in a storage position, a ready position or a deployed position. The signal has a main body with a storage ledge, a retainer and a pocket. A trigger is provided having a notch for engaging a segment of fishing line and having a kick-out post for deploying a signal. The kick-out post can be held with a pocket in the ready position. Rotation of the trigger caused by a strike forces the post from the pocket and causes the wire of the signal to clear a retainer on the side of the main body. A tension assembly is provided for adjusting the amount of force that is required to rotate the trigger. The post and a ledge holds the signal in place and the tensioner can be used to lock the signal in the storage position.

20 Claims, 14 Drawing Sheets

FISH STRIKE INDICATOR

This utility patent application claims priority on and the benefit of provisional application 61/120,434 filed Dec. 6, 2008, the entire contents of which are hereby incorporated herein by reference.

BACKGROUND OF THE INVENTION

1. Field of the Invention

The present invention relates to a fish strike indicator, and in particular to a fish strike indicator that is non-obtrusive to the user, that is adjustable and that does not interfere with operation of the fishing rod and reel after the indicator is deployed.

2. Description of the Related Art

Fishing, and in particular ice fishing, is an extremely popular sport. There are numerous methods and devices used by the ice fishers in this sport.

One method employs the use a slip bobber to indicate a strike. The disadvantage of this method is that it is very difficult to see a bobber in the ice fishing hole if the angler is more than about fifteen feet away from it due to the geometry of the line of site into the fishing hole. The range decreases significantly when snow or ice is accumulated around the hole.

Another method is to use the fishing rod itself as the strike indicator. This tackle configuration has been referred to as "dead stick" or "still line" fishing. One main drawback with this method is that the angler must constantly watch the tip of their pole for any movement indicative of a fish strike. Visibility is also the big drawback to this method due to the fact that the pole becomes increasingly more difficult to see the further the angler is from it.

A major disadvantage to both the bobber and the "dead stick" methods is that they only notify an angler during a fish strike event. If the angler fails to see the bobber go down or their rod tip bends over and the fish doesn't remain hooked, the angler may be oblivious to the fact that he/she ever had a fish strike. The angler may then unknowingly be missing the bait on the end of their line.

A third technique used for ice fishing incorporates the use of a tip-up. A tip-up uses a highly visible flag to notify an angler that a fish strike has occurred, consequently, allowing the angler to place the tip-up at a much greater distance from him/her. The down side to using a tip-up is that there is no rod and reel involved. When a fish strikes and becomes hooked, the angler must pull the line in with his/her bare hands, usually while kneeling in water or slush on the ice next to the fishing hole. As the angler pulls the fish in through the ice hole, the excess line is dropped onto the ice, frequently becoming tangled. Before the tip-up can be reset, the line must be rewound back onto the spool by hand.

Acknowledging the drawbacks with these methods and devices, several products have been developed to overcome these issues. While each of these products may work well for their intended purposes, each is not without drawbacks. Some examples include:

U.S. Pat. No. 5,129,174 (hereafter "USPN") to Wilson is titled Fishing Line Holder. This patent shows a plastic pinching device for holding a line. This product appears to be connectable to the handle, and as such, can be obtrusive to the user.

U.S. Pat. No. 5,586,402 to Brent et al. is titled Fishing Rod Bite Indicator. This patent illustrates a visual rod indicator housed within a slide tube. One drawback of this invention is that it does not appear to release the line after a strike.

U.S. Pat. No. 5,683,629 to Robichaud et al. is titled Pocket Size Fish Strike Indicating Fixture. This patent demonstrates a device that is designed to snap on and off of a fishing pole in two points. This can be problematic, since fishing poles do not have a uniform dimension. Also, having the device connect to the pole at two locations can interfere with the engineered flexural characteristics of the fishing pole.

U.S. Pat. No. 7,454,861 to Keibler is titled Fishing Line Release and Bite Alarm Apparatus. This product appears to connect to the handle, which some anglers find objectionable.

None of these devices show a fish strike indicator that is designed for use with poles of various sizes.

None of these devices show a fish strike indicator that has a rod lock that is fixed about the fishing rod at a single location on the rod to minimize any changes in the flexural characteristics of the fishing rod.

None of these devices show a trigger with a kick-out post to release a signal from a ready position to a deployed position.

None of these devices show a fish strike indicator having a trigger that is flush with the main body during a storage position so as to minimize obtrusiveness to the user.

None of these devices show a trigger tensioner that can set the sensitivity of the trigger and also lock the fish strike indicator in the storage position.

Thus there exists a need for a fish strike indicator that solves these and other problems.

SUMMARY OF THE INVENTION

The present invention relates to a fish strike indicator that can selectively be placed in a storage position, a ready position or a deployed position. The indicator has a main body with a storage ledge, a retainer and a pocket. A trigger is provided having a notch for engaging a segment of fishing line and having a kick-out post for deploying an indicator. The kick-out post can be held with a pocket in the ready position. Rotation of the trigger caused by a strike forces the post from the pocket and causes the wire of the indicator to clear a retainer on the side of the main body. A tension assembly is provided for adjusting the amount of force that is required to rotate the trigger. The post and a ledge holds the indicator in place and the tensioner can be used to lock the indicator in the storage position.

According to one advantage of the present invention, the fish strike indicator is designed for use with poles of various sizes. This is accomplished in a preferred embodiment by utilizing a compressible material within the channel of the main body.

According to another advantage of the present invention, the fish strike indicator has a rod lock that is fixed about the fishing rod at a single location to minimize any changes in the flexural characteristics of the fishing rod. The rod lock is easy to use. The fish strike indicator can be stored on the rod without any interference to the operation of the rod when the angler chooses to not use the fish strike indicator.

According to a further advantage of the present invention, the fish strike indicator has a trigger with a kick-out post to release a signal from a ready position to a deployed position. Accordingly, the movement of the trigger directly causes deployment of the indicator without any intermediate parts.

According to a still further advantage of the present invention, the fish strike indicator has a trigger that is flush with the main body during a storage position so as to minimize obtrusiveness to the user.

According to a still further advantage yet of the present invention, the fish strike indicator tension assembly can lock the indicator in a storage position that is unobtrusive to the angler.

According to a still further advantage yet of the present invention, the fish strike indicator trigger fully releases the line after a fish strike to enable normal operation of the fishing apparatus.

According to a still further advantage yet of the present invention, the fish strike indicator is viewable from a great distance from the ice fishing hole and/or shoreline or pier.

Other advantages, benefits, and features of the present invention will become apparent to those skilled in the art upon reading the detailed description of the invention and studying the drawings.

DETAILED DESCRIPTION OF THE PREFERRED EMBODIMENTS

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

The present invention can be used with a conventional fishing apparatus 10. The fishing apparatus can have a reel 11 and a rod 12. Eyelets 13 and 14 are provided along the length of the rod. The rod has a longitudinal axis. A selected amount and type of line 15 can be placed through the eyelets during use. The exact dimensions of the fishing apparatus are not important, as the present invention as described below accommodates rods of various sizes.

Turning now to the present invention, it is seen that a preferred embodiment of an indicator 20 is provided in FIGS. 1-14. The indicator 20 generally comprises a main body 30, a rod lock 60, a foam insert 70, a signal 80, a trigger 90 and a tension assembly 100. Each of these components and their interrelationships are described below.

The main body 30, as seen in each of the figures, has a top 31, a bottom 32, a first end 33, a second end 34, a first side 35 and a second side 36. The main body is preferably made of plastic and can have dimensions generally about 2 inch L by ¾ inch W by ¾ inch H. Yet, it is appreciated that other dimensions and materials may be used without departing from the broad aspects of the present invention.

The main body 30 preferably has a ledge 40, as seen in FIGS. 5-8 and 11-14. The ledge is preferably located at or near the first end 33 of the main body 30, and is preferably formed integral therewith. The ledge can have a top that lies in a planar surface. The ledge top extends away from the first side 35 of the main body a selected amount and is located intermediate the main body top and bottom. In the preferred embodiment, the ledge 40 is located closer to the main body top than the main body bottom.

The main body 30 also preferably has a retainer 41, which can be seen in FIGS. 4, 7 and 11-14. The retainer preferably extends from the first side 35 of the main body 30 at or adjacent the top 31. The retainer 41 preferably has a bottom that lies in a plane that is generally parallel to the top of the main body.

It is appreciated that the ledge 40 and retainer 41 are preferably integral parts of the main body 30. Yet, it is also understood that these components can be added to the main body after manufacture of the main body.

Figure 1:
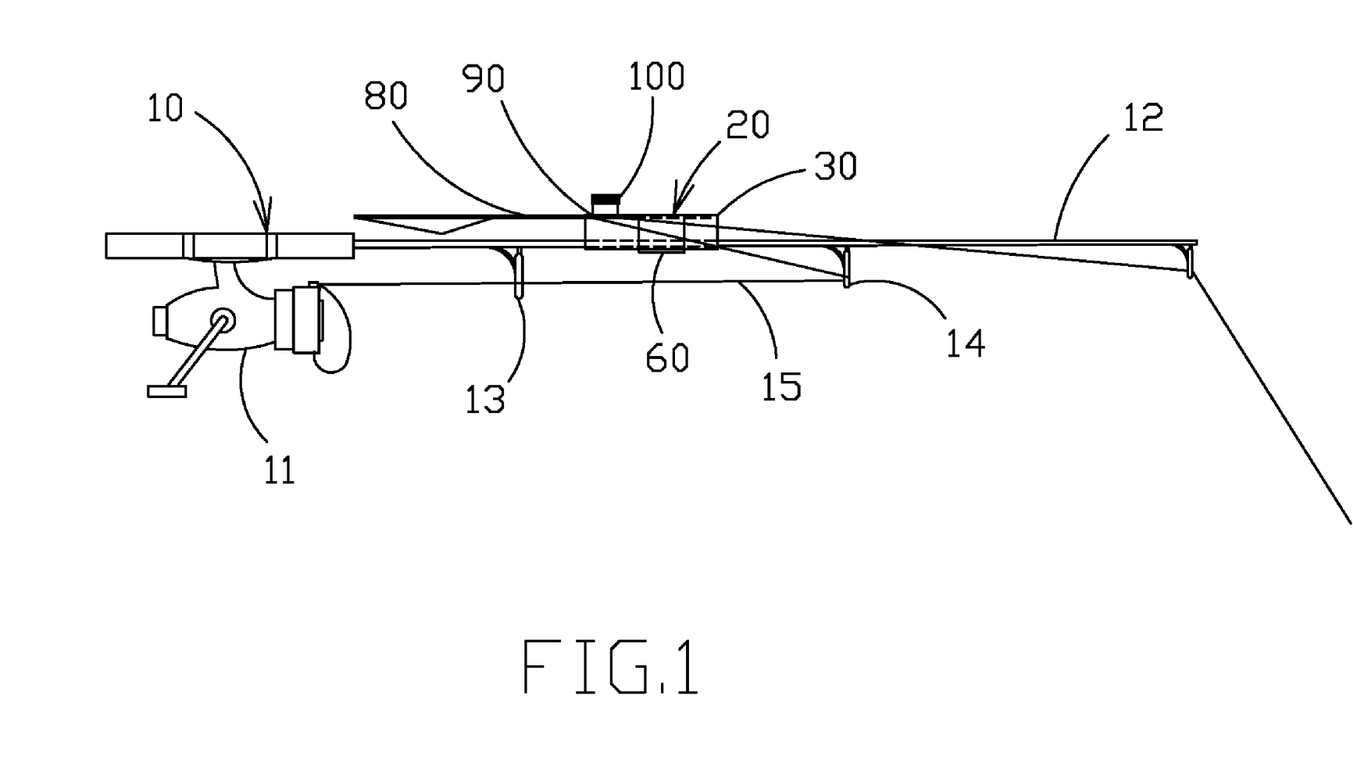
FIG. 1 is a side view of a preferred embodiment of the present invention connected to a fishing apparatus and is shown in a ready position.
Figure 2:
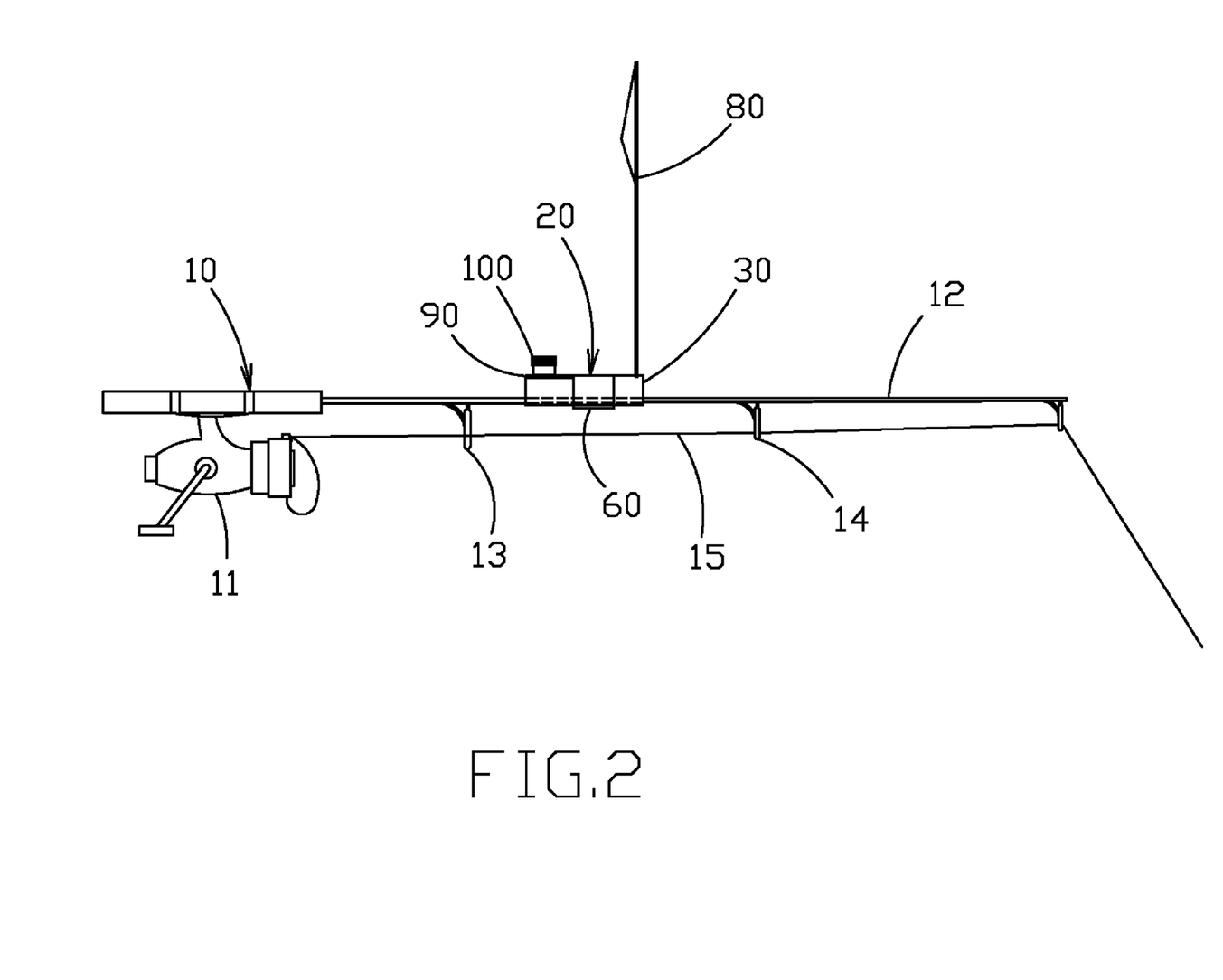
FIG. 2 is similar to FIG. 1, but shows the preferred embodiment of FIG. 1 in a deployed position.
Figure 3:
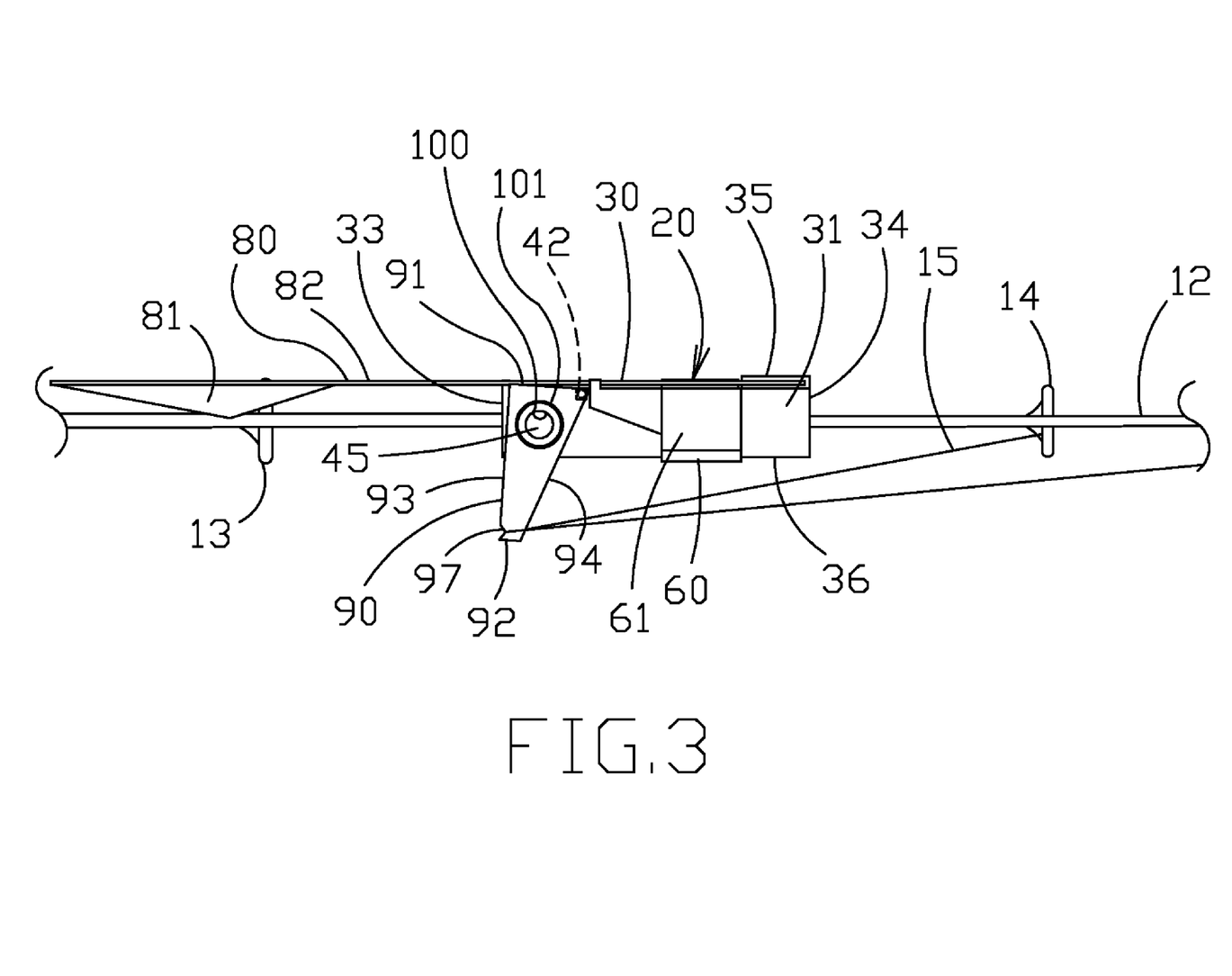
FIG. 3 is a top view of the preferred embodiment shown in FIG. 1 in a ready position.
Figure 4:
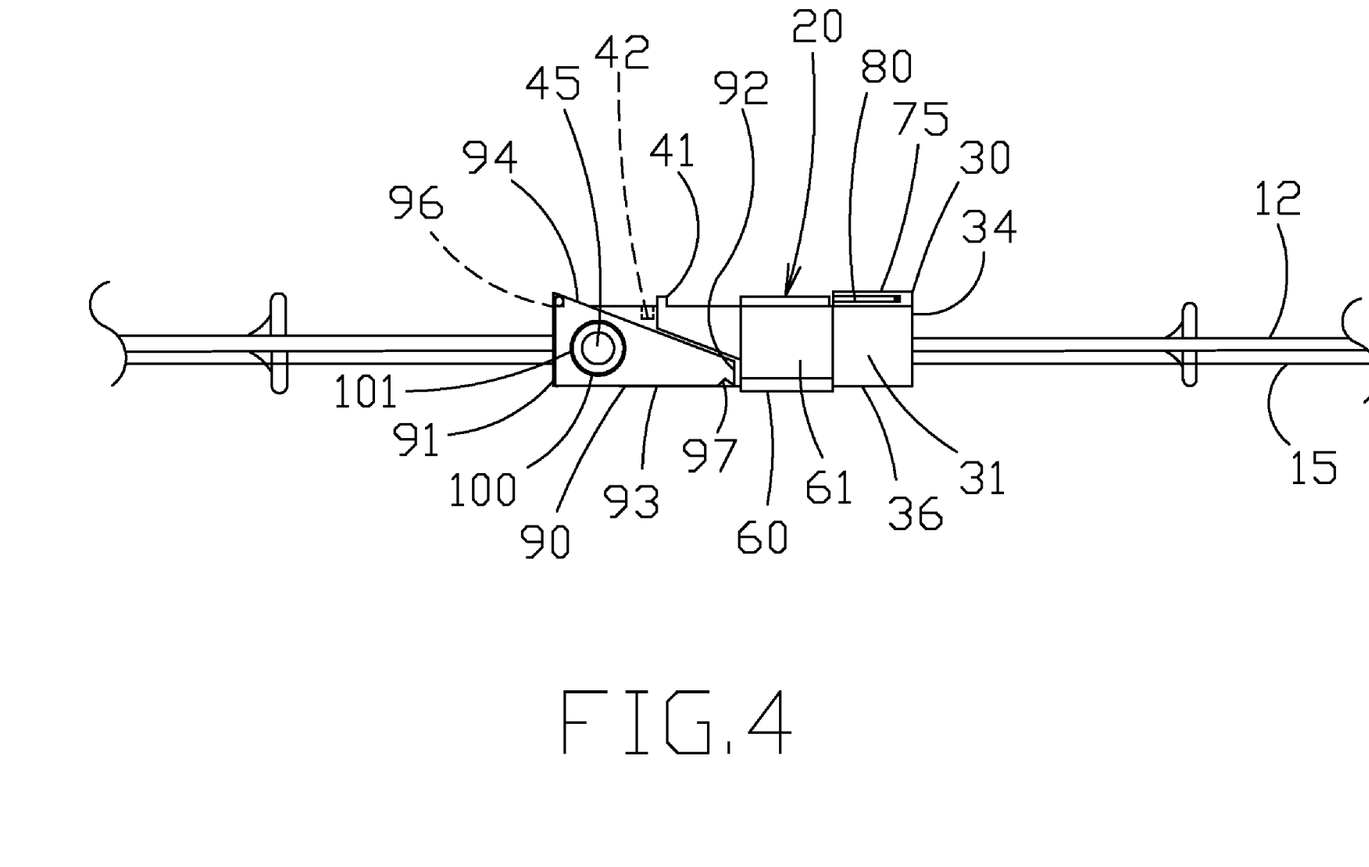
FIG. 4 is similar to FIG. 3, but shows the preferred embodiment of FIG. 1 in the deployed position.
Figure 5:
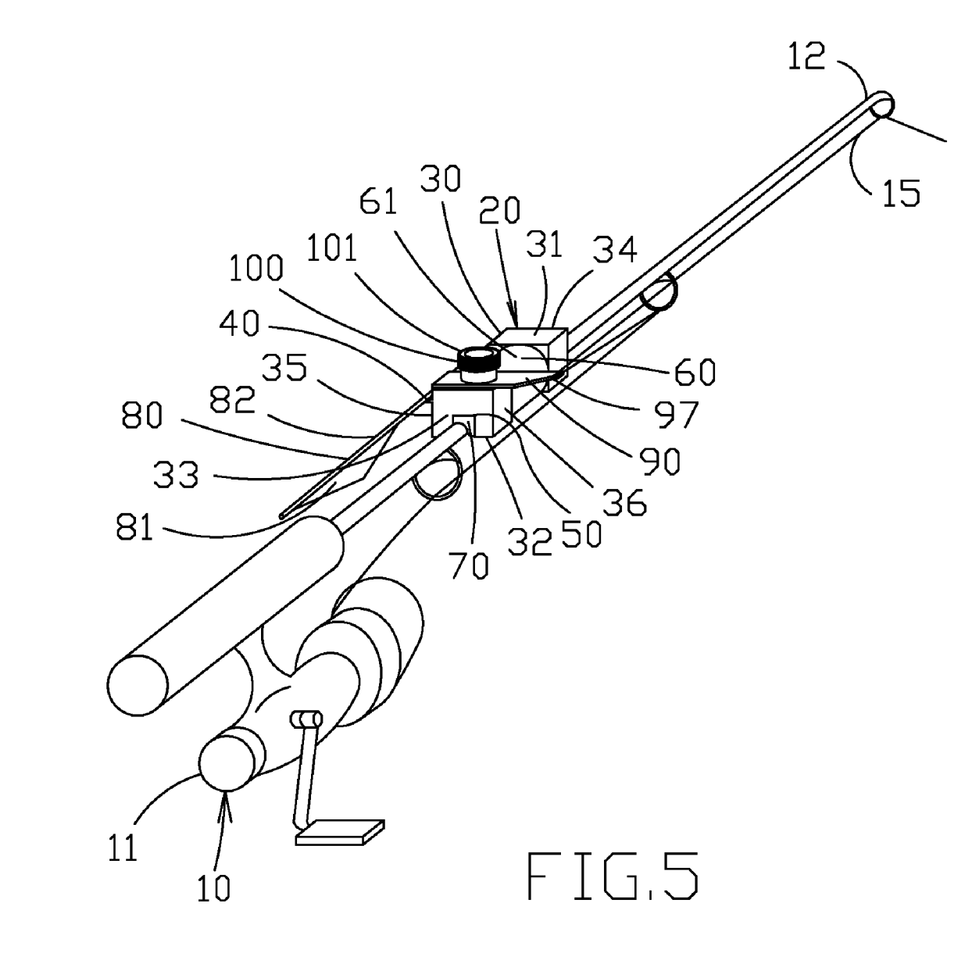
FIG. 5 is a perspective view of the present invention showing the preferred embodiment of FIG. 1 in a ready position.
Figure 6:
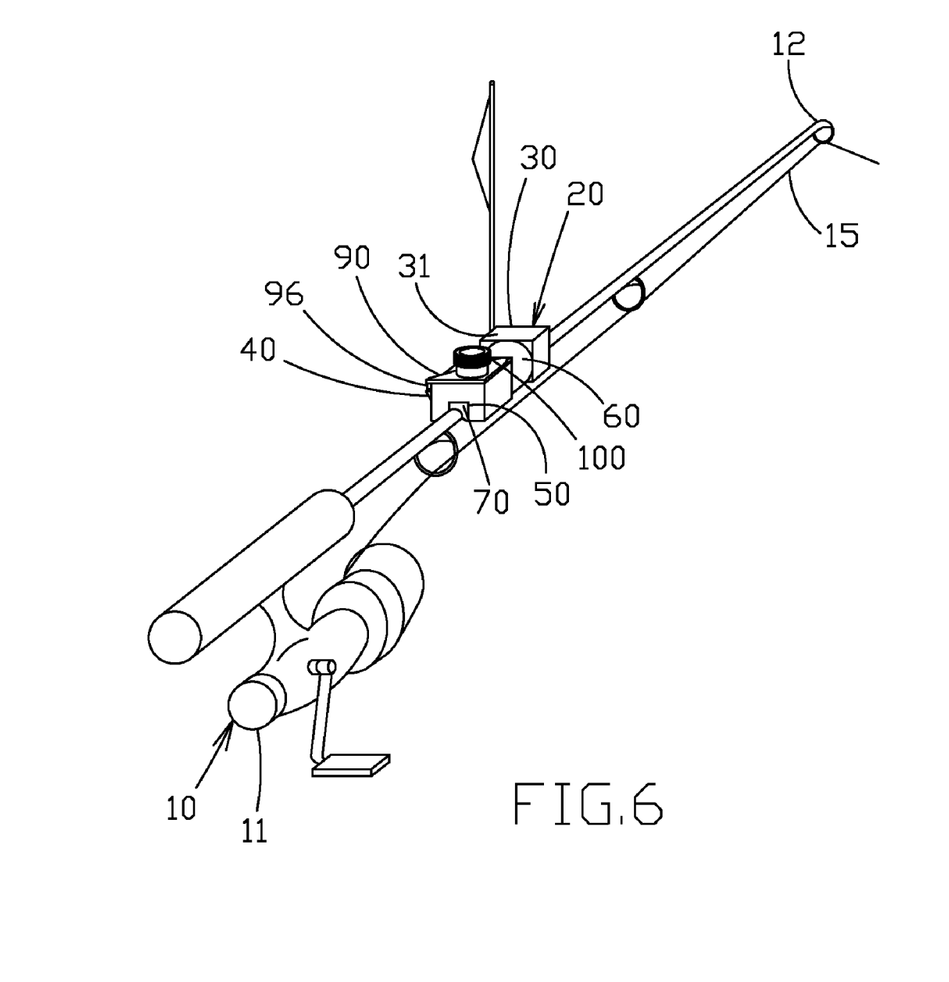
FIG. 6 is similar to FIG. 5, but shows the preferred embodiment of FIG. 1 in the deployed position.
Figure 7:
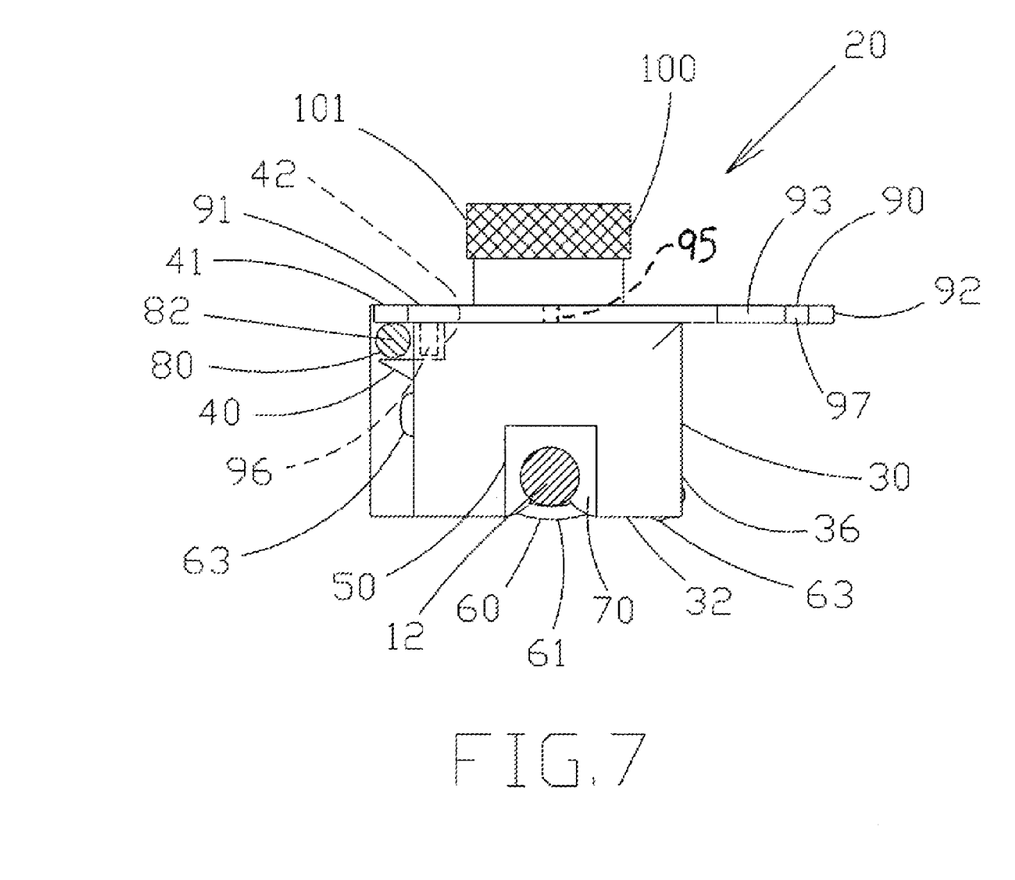
FIG. 7 is an end view of the preferred embodiment illustrated in FIG. 1 shown in the ready position.
Figure 8:
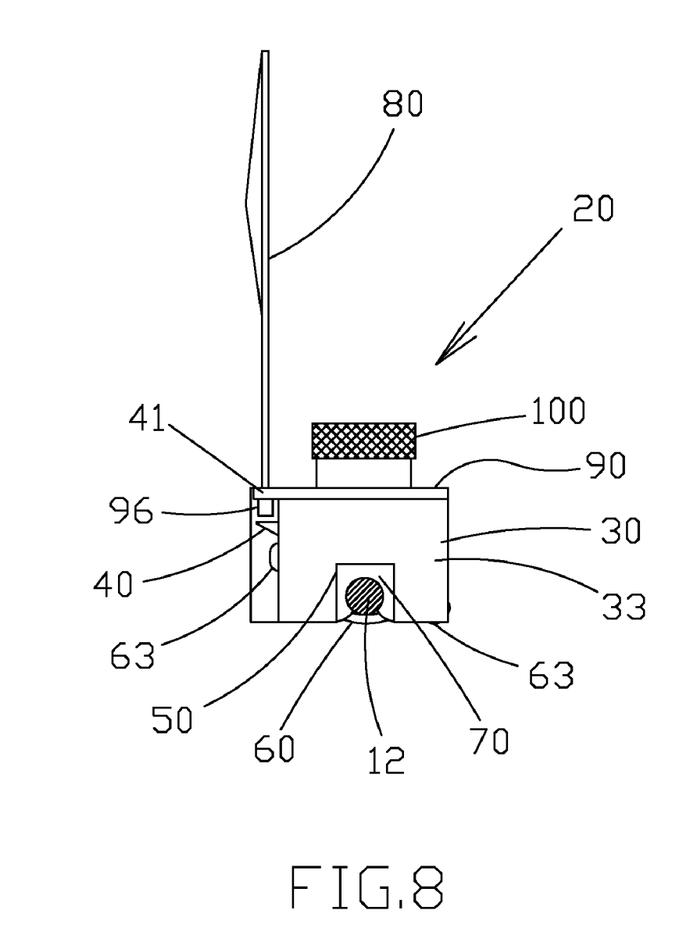
FIG. 8 is similar to FIG. 7, but shows the preferred embodiment of FIG. 1 in the deployed position.

Looking now to FIGS. 3, 4 and 7, it is seen that a pocket 42 is provided within the main body 30. The pocket 42 is preferably open to both the main body top 31 and the main body first side 35. The pocket 42 is preferably located adjacent the retainer 41.

Figure 14:
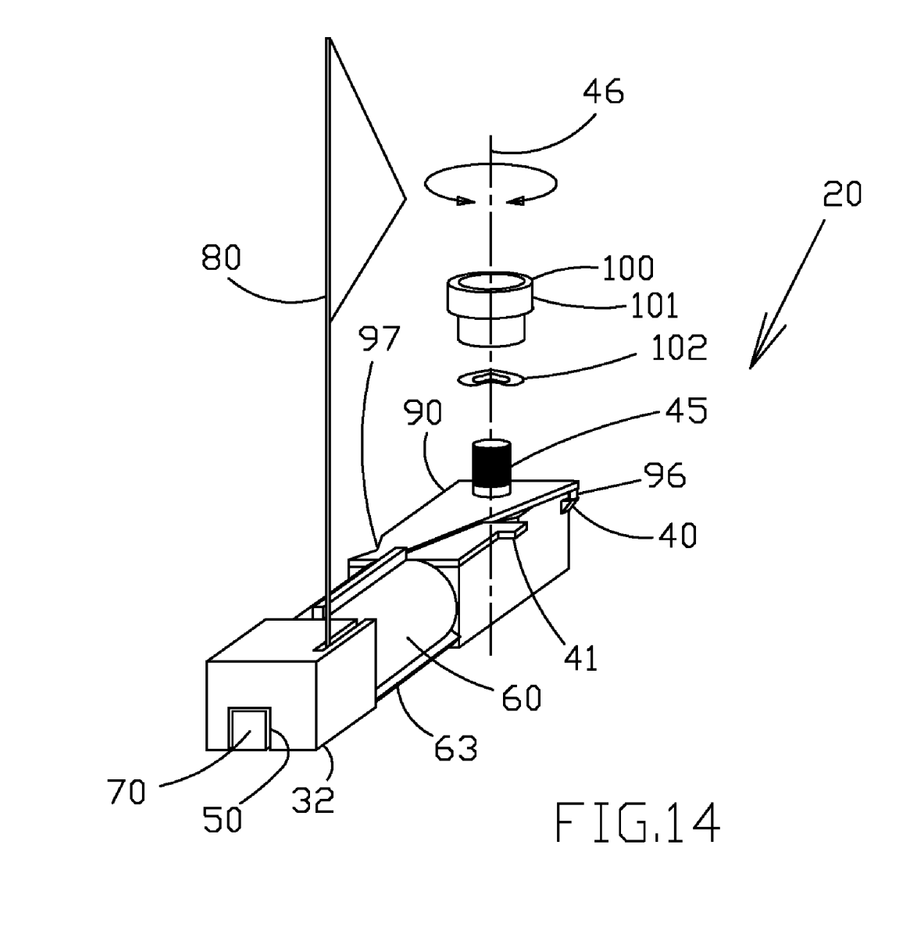
FIG. 14 is a partial exploded view of the preferred embodiment shown in FIG. 1 illustrating a preferred embodiment of a tension assembly.

The main body 30 also has a vertical post 45, as best illustrated in FIG. 14. The main body post 45 has a vertical axis 46. In the preferred embodiment, the main body post is a stud that is threaded and that projects vertical generally perpendicular to the main body top 31.

A channel 50 is further provided, as seen in FIGS. 5-10. The channel preferably has a generally square cross-section. Yet, it is understood that other cross-sectional profiles may be used without departing from the broadest aspects of the present invention. The channel 50 is preferably open to the main body first end 33 and the main body second end 34, and also to the main body bottom 32. The channel 50 is preferably linear and has a longitudinal axis. The longitudinal axis of the channel is preferably perpendicular to the vertical axis 46 of the main body post 45.

Turning now to FIGS. 8-14, it is seen that a preferred embodiment of a rod lock 60 is illustrated. The rod lock 60 has a body 61 with an opening 62 and with several ribs 63. The cross-section of the body is generally circular, and the body 61 of the rod lock 60 is preferably concentric with a central axis of the main body 30. In this regard, the user can manipulate the orientation of the rod lock 60 relative the main body 30 by using the ribs 30 to selectively align or misalign the rod lock opening 62 with the channel. Access to the channel 50 is unimpeded when the rod lock opening 62 is aligned with the channel 50.

It is appreciated that other rod lock embodiments may be utilized without departing from the broad aspects of the present invention. For example, clamps, clips, hook and eye fabric and other removably type locks may alternatively be used.

A compressible material 70, such as foam, may be located within the channel 50. The compressible material 70 can be permanently fixed within the channel. The foam compresses when a rod is received within the channel 50 to snugly and frictionally engage the section of rod. In this regard, the rod 12 is securely held in place regardless of the diameter of the rod, so long as the rod diameter is smaller than the overall width of the channel 50.

Figure 9:
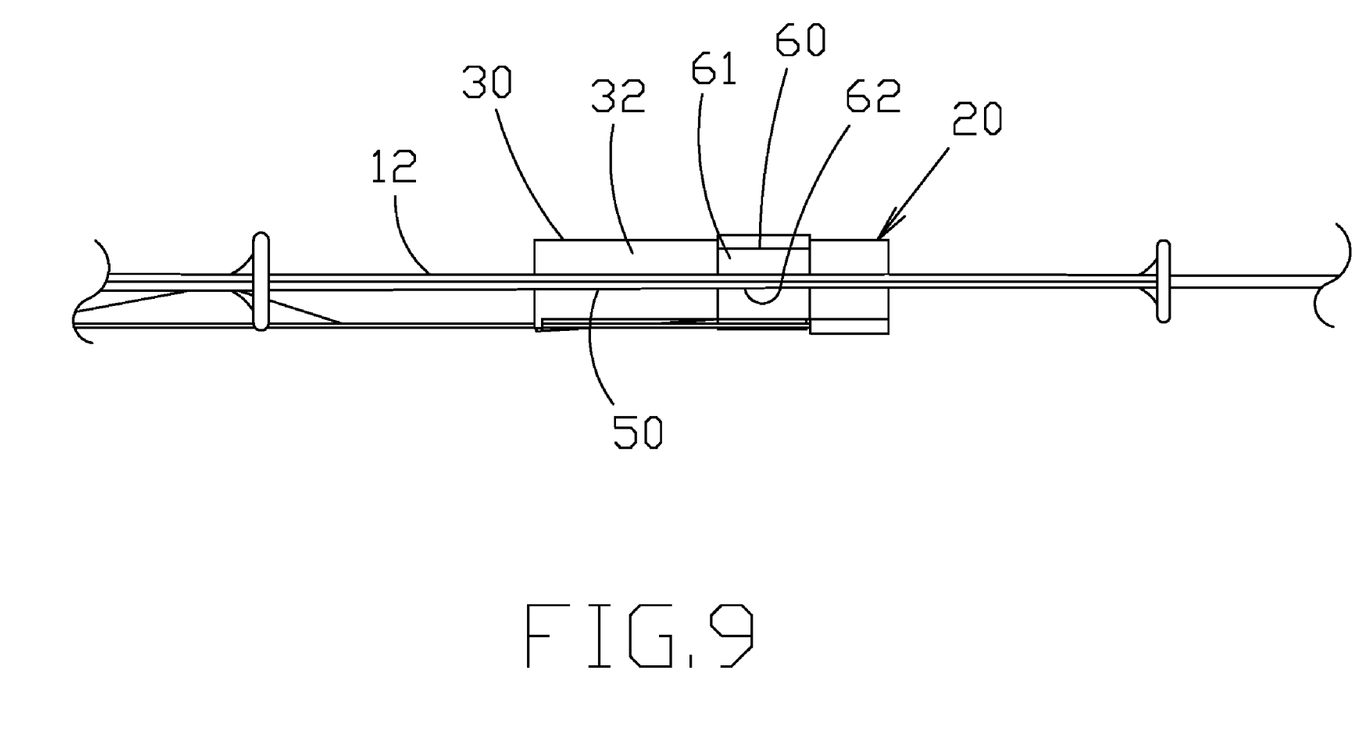
FIG. 9 is a bottom view showing a preferred embodiment of the rod lock in an open position.
Figure 10:
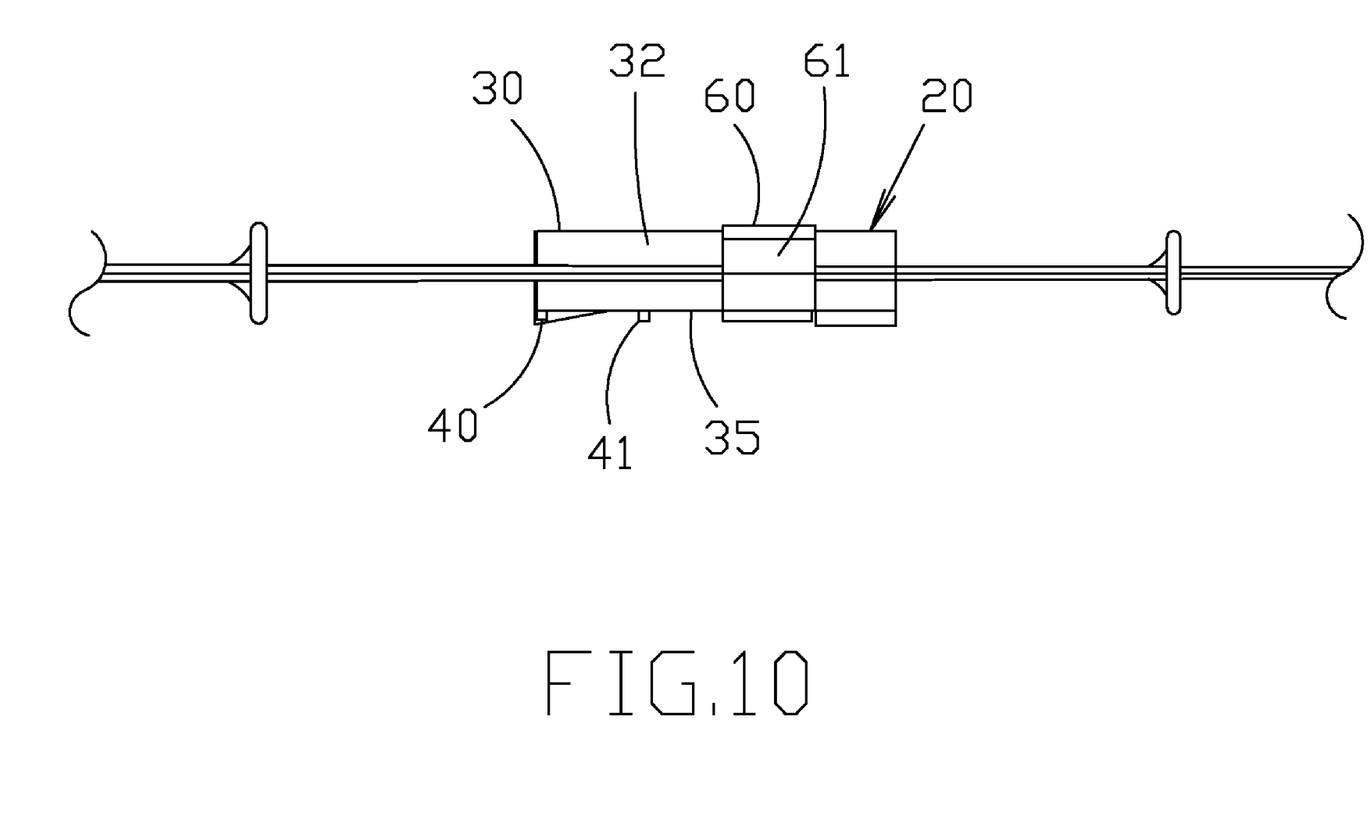
FIG. 10 is similar to FIG. 9, but shows the rod lock in a locked position.

It is seen in FIGS. 9 and 10 that the rod 12 is engaged by the indicator 20 at a single location, i.e. at the rod lock 60. Alterations to the flexural characteristics of the rod 12 are minimized.

A signal 80 is further provided. One preferred embodiment utilizes a flag 81 attached to a wire 82. The wire is preferably returnably deformable within the range of operation. It is appreciated that other specific signal structures could be employed without departing from the broad aspects of the present invention. The signal can selectively be placed in a storage position, a ready position and a deployed position. Each of these positions is discussed below.

A trigger 90 is also provided. The trigger 90 has a first end 91 and a second end 92, a first side 93 and a second side 94. A hole 95 is formed through the trigger between the trigger top and the trigger bottom. The trigger top and the trigger bottom are both generally planar. A trigger post 96 is also provided. The post 96 extends downwardly from adjacent the intersection of the first end 91 and the second side 94. A notch 97 is also provided. The notch 97 is formed in the first side 93 of the trigger near the second end 92. It is appreciated that the post 96 and the notch 97 are on opposite sides of the hole 95.

The trigger 90 is attached to the main body 30 via the main body post 45 extending through the trigger hole 95. The trigger 90 is rotatable upon the main body 30, wherein the notch 97 and trigger post 96 move in opposite directions. The trigger post 96 can be recessed within the pocket 42 at one end of the range of trigger rotation and can be adjacent the ledge 41 at the other end of the range of trigger rotation.

A tension assembly 100, as best seen in FIG. 14, is further provided to select the sensitivity of the trigger 90. The tension assembly has a nut 101 and a spring washer 102. The nut 101 and spring washer 105 are received upon the main body post 45. The spring washer 102 imparts an increasing amount of force vertically upon the trigger 90 as the tension assembly 100 is tightened. The increase in vertical force is directly related to the amount of rotational force that is required to rotate the trigger 90 about the main body 30. The trigger can be in a static state where no motion occurs all the way to a dynamic state with little or no resistance to rotation. When the tension assembly 100 is fully tightened, the trigger 90 is locked in position relative the main body 30.

Having now described the components, some of the interrelationships will now be described.

Figure 11:
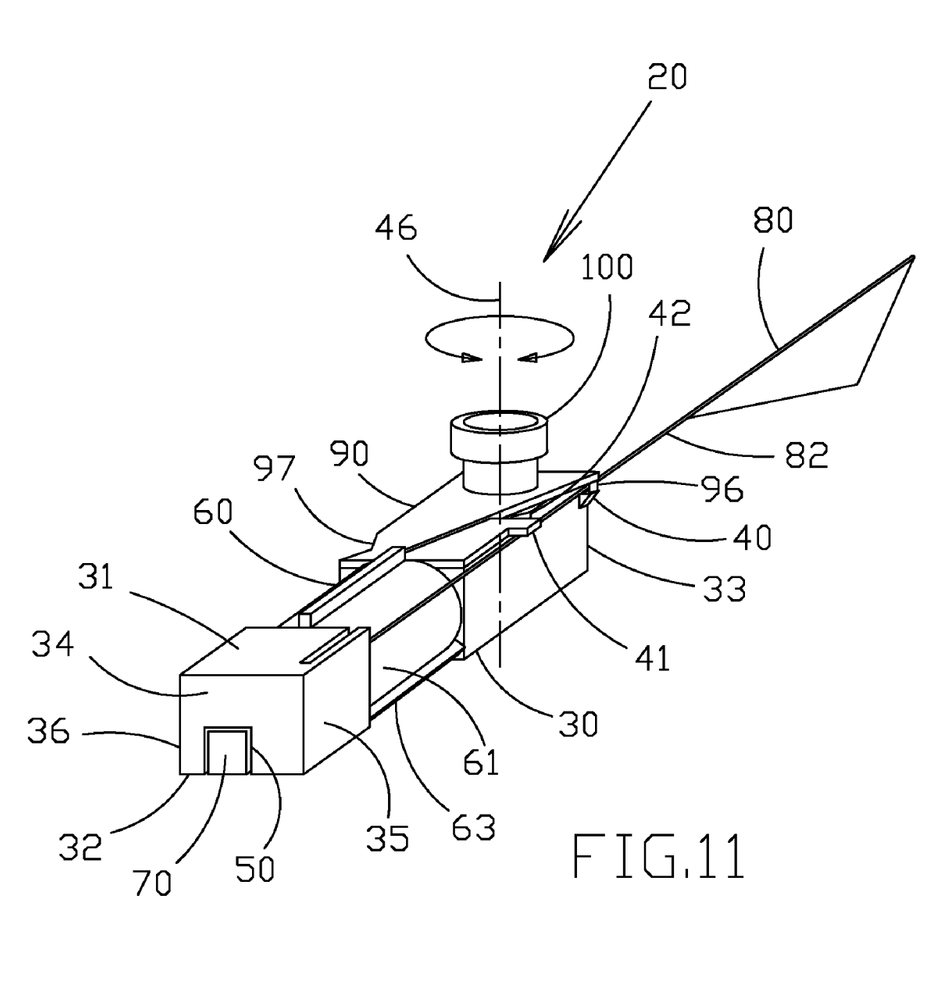
FIG. 11 is a perspective view of the preferred embodiment of FIG. 1 showing the fish strike indicator in a storage position.

Looking specifically at FIG. 11, it is seen that the signal 80 is in the storage position. This is accomplished by containing the wire 82 in an area bound by the trigger 90 including the trigger post 96, and the main body 30 including the ledge 40. The tension assembly 100 is fully secured to the main body post 45 so that the trigger 90 is unable to rotate about the post. It is also noted that the trigger 90 is nearly fully within the perimeter defined by the main body first end 33, second end 34, first side 35 and second side 36. The indicator 20 can stay secured to the rod 12 when not in use and will not affect the operation of the rod. The wire 82 of the signal 80 is nearly flush with the first side 35 of the main body 30 in the storage position. The wire is between two of three preferred ribs 63 of the rod lock, wherein the rotation of the rod lock is inhibited by the wire 82. In this regard, when in the storage position, the rod lock 60 is fully locked in place to prevent the indicator 20 from inadvertently disengaging the rod 12.

Figure 12:
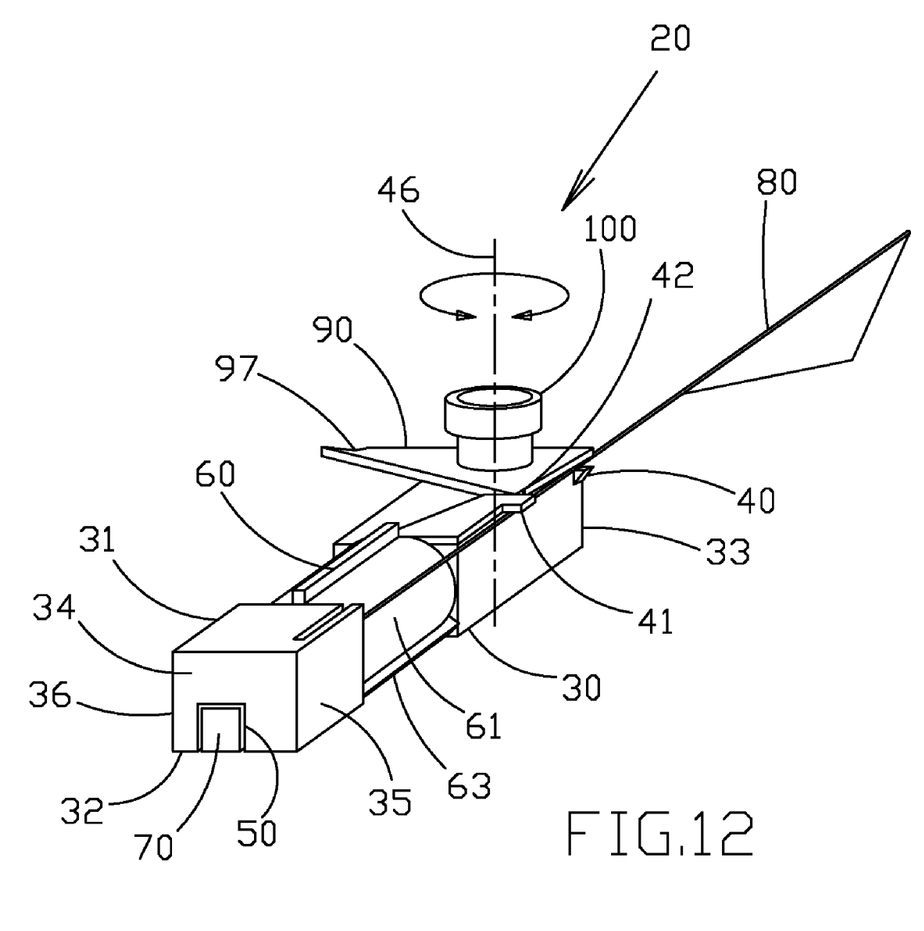
FIG. 12 is similar to FIG. 11, but shows the preferred embodiment of FIG. 1 in a ready position.

Looking now to FIGS. 3 and 12, it is seen that the signal 80 is in the ready position. This is accomplished by adjusting the tension assembly 100 to select the amount of force required to rotate the trigger 90 about the post 45. Then, the trigger is rotated so that the trigger post 96 is housed within pocket 42 within the main body. Lastly, the signal 80 is placed under the retainer 41. The spring bias in the signal wire 82 creates a friction force between the spring wire 82 and the retainer 41 sufficient to hold the signal in position.

The line 15 can be pulled rearward from an eyelet and can engage the notch 97 of the trigger 90. The tension assembly 100 provides a sufficient force to prevent unintended rotation of the trigger prior to a fish strike event. During a fish strike event, the tension in the line 15 will overcome the force preventing rotation and the trigger 90 will rotate about the main body post. When this occurs, the trigger post 96 will be swung out of the pocket 42 forcing the signal wire 82 to disengage from the retainer 41. When that happens, the spring bias in the signal wire will cause the signal 80 to deploy and the flag 81 to be visible from afar. At the same time, the line 15 will clear the notch 97 as it swings towards the main body 30 and the line will be released.

Figure 13:
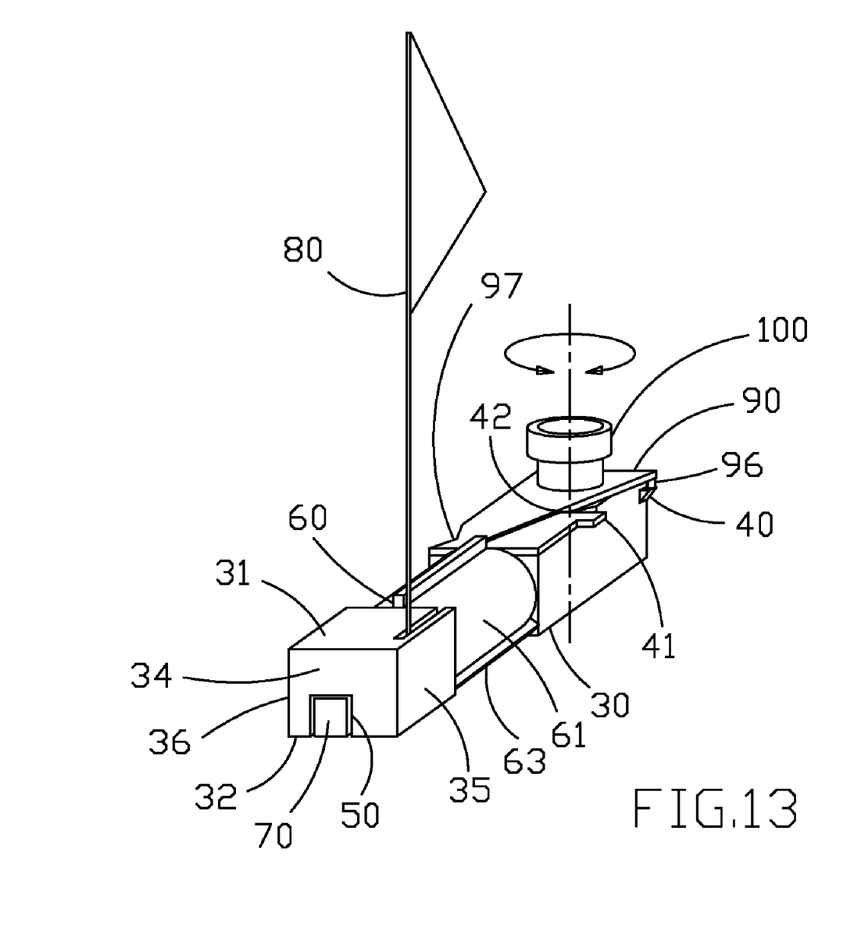
FIG. 13 is similar to FIG. 11, but shows the preferred embodiment of FIG. 1 in a deployed position.

The deployed position is illustrated in FIG. 13. From the deployed position, the signal can be placed in either the storage position or the ready position.

Thus it is apparent that there has been provided, in accordance with the invention, fish strike indicator that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. An indicator for signaling a fish strike upon an end of a line of a fishing apparatus having a rod, said indicator comprising:
   a signal operable between a ready position and a deployed position;
   a main body having a retainer removably holding said signal in said ready position, said retainer being stationary relative said body; and
   a trigger having a longitudinal trigger plane and being connected to said main body, said trigger interfacing with the line at a notch, and said trigger having a post, said post being integral with said trigger and extending downwardly from said trigger in a direction generally perpendicular to said longitudinal trigger plane,
   wherein a fish strike upon the line trips said trigger whereby said post of said trigger swings to directly cause said signal to move from said ready position held by said retainer to said deployed position by having said post move said signal from said retainer.

2. The indicator of claim 1 wherein:
   said main body further comprises:
   a main body top;
   a main body bottom;
   a main body first side;

a main body second side; and
a pocket open to said main body first side and said main body top; and
said post is received within said pocket when said trigger is in the ready position.

3. The indicator of claim 2 wherein:
said retainer extends from said main body first side;
said signal comprises a wire and a flag, said wire being biased to move said signal to the deployed position wherein said flag and said wire extend vertically relative said main body top and said wire being held by said retainer when said signal is in the ready position; and
said post is removed from said pocket during a fish strike to cause said signal to free from said retainer.

4. The indicator of claim 2 wherein:
said main body further comprises a ledge;
said signal is further operable to a storage position wherein said signal is held adjacent said ledge; and
said trigger is rotatable relative to said main body so that said trigger including said post and said main body including said ledge contain said signal in said storage position.

5. The indicator of claim 4 further comprising a tension assembly, said tension assembly selectively:
controlling an amount of line tension that is required to operate said trigger; and
locking the trigger in a selected position to lock said signal in the storage position.

6. The indicator of claim 1 wherein:
said main body has a channel receiving a selected portion of the rod; and
said indicator further comprises a rod lock, said rod lock fixing said indicator upon the rod at a single position.

7. The indicator of claim 6 wherein the rod has a size, said rod further comprising a compressible insert within said channel, said compressible insert being compressed a selected amount as determined by the size of the rod, whereby said indicator is adaptable for use with rods of various sizes.

8. An indicator for signaling a fish strike upon an end of a line of a fishing apparatus having a rod, said indicator comprising:
a signal operable between a ready position and a deployed position;
a main body having a main body first end and a main body second end:
a main body channel defining a main body channel axis and selectively receiving a portion of the rod, said main body channel being an open channel; and
a rod lock locking said indicator onto the rod at a single location, said rod lock having a rod lock opening extending longitudinally between a first longitudinal rod lock end and a second longitudinal rod lock end, the rod lock opening being parallel to said main body channel axis, wherein in an unlocked position said rod lock opening is aligned with said main body channel and in a locked position said rod lock opening is misaligned with said main body channel, said rod lock being locked by rotation about said main body channel axis to enclose the rod within said main body channel, and said rod lock being located between said main body first end and said main body second end; and
a trigger connected to said main body, said trigger interfacing with the line, wherein a fish strike upon the line trips said trigger whereby said trigger causes said signal to move from said ready position to said deployed position and the line is fully released from said indicator.

9. The indicator of claim 8 wherein:
said main body comprises:
a main body top;
a main body bottom;
a main body first side;
a main body second side;
a main body first end; and
a main body second end,
wherein said channel is open to said main body first end and said main body second end, and is open to one of said main body top, said main body bottom, said main body first side and said main body second side; and
said indicator further comprises a selected amount of compressible material within said channel to frictionally engage the rod received within the channel.

10. The indicator of claim 9 wherein said trigger comprises a generally V-shaped notch to releasably engage a portion of the line, whereby when a selected amount of tension is developed in the line, said trigger trips to release said signal from the ready position.

11. The indicator of claim 10 wherein:
said main body further comprises a retainer, said retainer holding said signal in a ready position; and
said signal moves from a ready position to a deployed position under operation of said trigger whereby said signal is released from said retainer.

12. The indicator of claim 11 wherein:
said trigger is rotatable upon said main body; and
said trigger further comprises an integral post, and said post initially moves away from said main body when said trigger begins rotating during a fish strike event to force said signal to clear said retainer.

13. The indicator of claim 12 further comprising a tension assembly, said tension assembly setting an amount of line tension that is required to cause said trigger to rotate in order to cause said post to force said signal from the control of said retainer.

14. The indicator of claim 12 wherein:
said main body further comprises:
a main body top;
a main body bottom;
a main body first side;
a main body second side; and
a ledge upon said main body first side; and
said signal is further operable to a storage position wherein said signal is held adjacent said ledge; and
said trigger is rotatable relative said main body so that said trigger including said post and said main body including said ledge contain said signal in said storage position.

15. The indicator of claim 8 wherein said rod lock comprises a rod lock body and a rod lock opening, said rod lock being rotatable about said main body whereby the indicator is locked onto the rod when said rod lock opening is misaligned with said channel and said indicator is unlocked to the rod when said rod lock opening is aligned with said channel.

16. An indicator for signaling a fish strike upon an end of a line of a fishing apparatus having a rod, said indicator comprising:
a signal operable between a ready position, a deployed position and a storage position;
a main body having:
a main body top;
a main body bottom;
a main body first side;
a main body second side;

a main body first longitudinal end;

a main body second longitudinal end;

a pocket between said main body first longitudinal end and said main body second longitudinal end;

a ledge at said main body first longitudinal end; and a trigger having a longitudinal trigger plane and a post, said post being integral with said trigger and extending downwardly from said trigger in a direction generally perpendicular to said longitudinal trigger plane, wherein:

said trigger is rotatable about an axis perpendicular to said main body top and said post moves about said axis between said pocket and said ledge as said trigger rotates;

said trigger extends beyond said main body second side and said post is within said pocket between said main body and said signal when said signal is in said ready position; and said trigger is within said main body second side, said post is adjacent said ledge and said signal is between said main body and said post when said signal is in said storage position.

17. The indicator of claim 16 wherein:

said main body further comprises a ledge upon said first side intermediate said main body top and said main body bottom, whereby said main body including said ledge and said trigger including said post define an area to hold said signal in a storage position.

18. The indicator of claim 17 wherein:

said main body further comprises a retainer, said signal being held by said retainer when said signal is in the ready position; and said post of said trigger directly forces said signal to be released from said retainer when said trigger rotates during a fish strike.

19. The indicator of claim 16 wherein:

said main body further comprises a channel for selectably receiving a portion of the rod; and said indicator further comprises a rod lock locking said indicator onto the rod at a single location.

20. The indicator of claim 16 further comprising a tension assembly with a spring washer, said tension assembly controlling an amount of force necessary to rotate said trigger.

* * * * *